DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUG. 1, 1972

901 O.G. 8

T901,011

COLORLESS POLYAMIDE COMPOSITIONS AND SHAPED ARTICLES STABILIZED FOR WEATHERABILITY

Roy Calvin Timmer, Claymont, Del., assignor to E. I. du Pont de Nemours and Company, Wilmington, Del.

Continuation of application Ser. No. 12,125, Feb. 17, 1970. This application Aug. 5, 1971, Ser. No. 169,486

Int. Cl. C08g *22/10*

U.S. Cl. 260—18 N

No Drawing. 10 Pages Specification

A composition containing 0.01 to 0.3 percent by weight copper stearate, 0.004 to 0.11 percent by weight manganous hypophosphite, 0.1 to 5 percent by weight potassium iodide and a complemental amount of a polyamide containing 75 to 100 percent by weight hexamethylene adipamide polymerized units and 0 to 25 percent by weight caprolactam polymerized units, and shaped articles such as monofilaments made therefrom.